United States Patent
Daly et al.

(10) Patent No.: US 10,692,361 B1
(45) Date of Patent: Jun. 23, 2020

(54) SELECTIVE AUDIO VISUAL ELEMENT PUBLIC WARNING

(71) Applicant: AT&T Intellectual Property I, L.P., Atlanta, GA (US)

(72) Inventors: Brian Daly, Atlanta, GA (US); Peter Bedell White, Atlanta, GA (US); Jeffrey Stewart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/287,786

(22) Filed: Feb. 27, 2019

(51) Int. Cl.
*G08B 27/00* (2006.01)
*G08B 21/10* (2006.01)
*H04L 29/08* (2006.01)
*G08B 19/00* (2006.01)

(52) U.S. Cl.
CPC ............ *G08B 27/00* (2013.01); *G08B 19/00* (2013.01); *G08B 21/10* (2013.01); *H04L 67/12* (2013.01)

(58) Field of Classification Search
CPC ........ G08B 27/00; G08B 19/00; G08B 21/10; H04L 67/12
See application file for complete search history.

(56) References Cited

U.S. PATENT DOCUMENTS

| | | |
|---|---|---|
| 5,574,999 A | 11/1996 | Gropper |
| 5,910,763 A | 6/1999 | Flanagan |
| 6,021,177 A | 2/2000 | Allport |
| 6,028,514 A | 2/2000 | Lemelson et al. |
| 6,112,075 A | 8/2000 | Weiser |
| 6,377,172 B1 | 4/2002 | Neer |
| 6,867,688 B2 | 3/2005 | Lamb |
| 7,277,018 B2 | 10/2007 | Reyes et al. |
| 7,358,855 B1 | 4/2008 | Willis |
| 7,460,020 B2 | 12/2008 | Reyes et al. |
| 7,595,717 B2 | 9/2009 | Boss et al. |
| 7,616,942 B2 | 11/2009 | Karl et al. |
| 7,683,792 B2 | 3/2010 | Araiza-Boys |
| 7,920,053 B2 | 4/2011 | Pattok et al. |
| 8,233,919 B2 * | 7/2012 | Haag ...................... G06Q 50/26 455/456.3 |
| 9,472,091 B2 | 10/2016 | Stern et al. |
| 9,499,126 B2 | 11/2016 | Anderson |
| 9,728,074 B2 | 8/2017 | Chiarizio et al. |
| 9,997,040 B2 | 6/2018 | Corum et al. |
| 2007/0207771 A1 * | 9/2007 | Bowser ................ G08B 27/005 455/404.1 |
| 2007/0296575 A1 | 12/2007 | Eisold et al. |

(Continued)

FOREIGN PATENT DOCUMENTS

| | | |
|---|---|---|
| JP | 5798827 B2 | 10/2015 |
| JP | 6143923 B1 | 6/2017 |

(Continued)

OTHER PUBLICATIONS

"Mass Public Alert Warning Platform"; Beeper; http://beepergroup.com/portfolio/mass-public-alert-warning-platform; © 2015; 2 pages.

(Continued)

*Primary Examiner* — Mohamed Barakat
(74) *Attorney, Agent, or Firm* — BakerHostetler

(57) ABSTRACT

Internet of thing (IoT) endpoints may be enabled to serve as a limited or wide-area public warning device.

20 Claims, 7 Drawing Sheets

(56) References Cited

U.S. PATENT DOCUMENTS

| | | |
|---|---|---|
| 2007/0298758 A1 | 12/2007 | Verma et al. |
| 2008/0238696 A1 | 10/2008 | Amorini et al. |
| 2009/0112626 A1 | 4/2009 | Talbot et al. |
| 2010/0075628 A1* | 3/2010 | Ye .................... H04W 4/90 455/404.2 |
| 2015/0140924 A1* | 5/2015 | Marathe ............ H04W 4/90 455/3.01 |
| 2016/0127439 A1 | 5/2016 | Ginnela et al. |
| 2017/0310802 A1 | 10/2017 | Pitts |
| 2017/0316679 A1 | 11/2017 | Hess et al. |

FOREIGN PATENT DOCUMENTS

| | | |
|---|---|---|
| JP | 6247489 B2 | 12/2017 |
| WO | WO 2003/081555 A1 | 10/2003 |
| WO | WO 2012/148291 A1 | 11/2012 |

OTHER PUBLICATIONS

"Warning Systems & Signals"; FEMA; https://www.ready.gov/alerts; 3 pages.

"Mass Notification System for business continuity professionals"; Aurea MessageOne; © 2018; https://alertfind.com/lp-mass-notification/?product=Emergency Alert System; 7 pages.

"Mass Alert"; Celltick; www.celltick.com:80/products/mass-alert/; © 2016; 4 pages.

"Mass Notification"; Everbridge; www.everbridge.com/products/mass-notification-and-incident-communications/; © 2018; 7 pages.

* cited by examiner

US 10,692,361 B1

SELECTIVE AUDIO VISUAL ELEMENT PUBLIC WARNING

TECHNICAL FIELD

The technical field generally relates to emergency alerts and, more specifically, to systems and methods for internet of things devices for emergency alerts.

BACKGROUND

Wireless emergency alert (WEA) messages may contain information pertaining to a variety of types of alerts. For example, a WEA message may pertain to weather conditions, disasters, AMBER (America's Missing: Broadcast Emergency Response) alerts, and/or alerts issued by the Government, or the like. WEA messages may be provided, via a mobile carrier, by authorized government entities such as, for example, a local public safety agency, a state public safety agency, the Federal Emergency Management Agency (FEMA), the Department of Homeland Security, the National Weather Service, the Federal Communications Commission (FCC), or the like.

Although WEA works well with people whom have mobile phones, there are certain areas where mobile phones are not allowed. This disclosure is directed to addressing issues in the existing technology.

SUMMARY

Disclosed herein are internet of thing (IoT) endpoints that may be enabled to serve as a limited or wide-area public warning device. In an example, an apparatus (e.g., server) may include a processor and a memory coupled with the processor that effectuates operations. The operations may include obtaining an indication of an emergency at a location; determining a configuration of each device of a plurality of internet of things (IoT) devices at the location, wherein the configuration comprises an audio configuration, a visual configuration, or a memory configuration for each device of the plurality of IoT devices at the location; determining a type of the emergency; and sending an emergency alert to the plurality of IoT devices, wherein the sending is based on the type of emergency and configuration of each device of the plurality of IoT devices at the location sending an emergency alert to the plurality of IoT devices, wherein the sending is based on the type of emergency and configuration of each device of the plurality of IoT devices at the location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Certain areas (e.g., schools, hospitals) require all cellphone users to turn off or mute their devices while present. Other areas may serve significant numbers of residents without cellphones or with older, less capable handsets. Wide-area alerting systems in some areas have been modernized (e.g., tornado sirens) but are neither ubiquitous nor capable of dealing with non-meteorological threats such as earthquakes or manmade threats such as nuclear, chemical, or conventional weapons attacks. Other mass warning systems (i.e., the Wireless Emergency Alert [WEA] system) require WEA-capable networks and cellular handsets, with resultant lag time between deployment and enough residents with WEA-capable handsets. WEA also is designed and operates with a several-minute period between threat presentation and receipt of warning by the designated population.

Disclosed herein are internet of thing (IoT) endpoints that may be enabled to serve as a limited or wide-area public warning device. As disclosed herein, this IoT endpoint may be referred to as a selective audio visual element (SAVE) device. For example, when activated by government officials, the SAVE device may use audio or visual indicators that a threat of death or serious injury is imminent, cuing all within its alerting range that immediate protective action (e.g., duck and cover, others as instructed by local authorities) should be taken. The SAVE device may also collect or upload environmental (e.g., radiological, chemical, seismic) information to appropriate authorities from affected sites. SAVE devices may integrate Alliance of Telecommunications Industry Solutions (ATIS)-standard early earthquake warning system (EEWS), which may dramatically reduce that period between threat presentation and receipt of warning by the designated population to approximately 30 seconds. Widespread adoption and deployment of SAVE enabled devices would quickly serve as a first-wave implementation of a new seismic/other threat alerting system, bridging the gap between existing wireless handsets and widespread adoption of EEWS-capable handsets.

Figure 1:
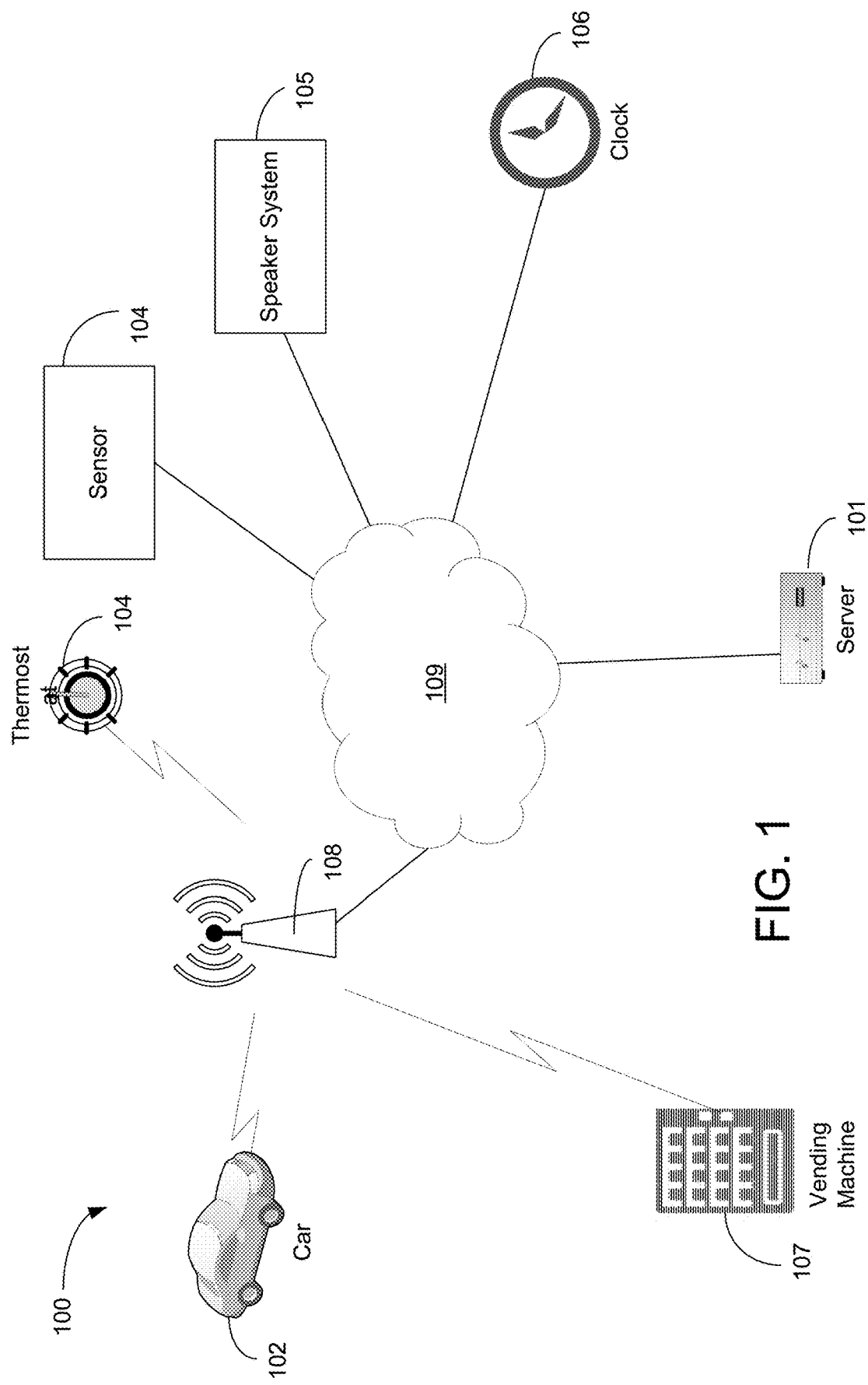
FIG. 1 illustrates an exemplary system that may implement selective audio visual element (SAVE) public warning.

FIG. 1 illustrates an exemplary system that may implement selective audio visual element (SAVE) public warning, as disclosed herein. System 100 may include server 101, base station 108, and a plurality of devices that may be internet of things (IoT) devices, such as vending machine 107, vehicle 102, thermostat 103, sensor 104, speaker system 105, or clock 106. The devices of system 100 may be communicatively connected via network 109. Server 101 may be used to obtain or provide alerts, which may be associated with emergencies.

Figure 2:
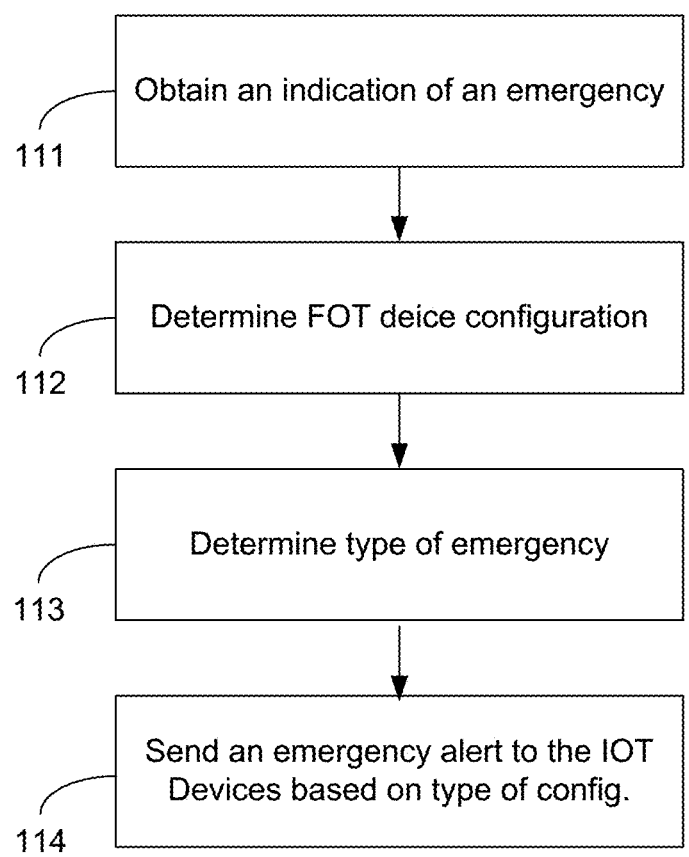
FIG. 2 illustrates an exemplary method for SAVE public warning.

FIG. 2 illustrates an exemplary method for SAVE public warning. At step 111, an indication of an emergency at a location may be obtained by server 101. The emergency may be an earthquake, tornado, hurricane, flood, artillery attack (which is likely in some countries), or other emergency event. The emergency may be based on seismic readings that indicate a severe earthquake, based on meteorological information that indicate a severe weather event, or satellite information that indicate an artillery threat, among others. At step 112, SAVE device configurations (e.g., IoT device configurations for the SAVE enabled devices) may be determined for the relevant emergency area associated with the location of the emergency. A relevant emergency area may be an area that is within a probable path (e.g., 5-mile radius) of an emergency (e.g., tornado). The SAVE device configurations may include audio configuration, visual configuration (e.g., display configuration), storage configuration, or communication configuration of the SAVE device. With regard to audio configuration, the SAVE device may be configured with predetermined (canned) voice audio alerts (e.g., "duck and cover"), obtained text-to-voice alerts (e.g., receive text from server 101 that is translated to audio), audio tones that indicate a particular type of emergency (e.g., indicated by sirens or "abnormal" high volume or elongated use of usual IoT device tones), or the like.

With regard to visual configurations, the SAVE device may be configured with a display or lights (e.g., LED lights) that may be used to communicate an emergency alert. For example, the display may be configured for simple text, graphics, change of colors, or change in display brightness that creates a pattern indicative of an emergency. In another example, the lights may be configured to change a color or brightness that creates a pattern indicative of an emergency alert. With regard to storage configurations, the SAVE device may be configured in a way that does not allow for much memory or processing power, such as a light (or sensor), and therefore the SAVE device may not be able to obtain or execute particular complex patterns indicative of an emergency alert. With regard to communication configuration, the SAVE device may be configured to obtain communication from different wireless protocols, such as Wi-Fi, Bluetooth, LTE, 5G, or the like. In addition, at a location, (e.g., a school) there may be one or more primary SAVE devices that receive the emergency messages and the primary SAVE device then distributes (e.g., broadcasts) the message to other SAVE devices within range. This local alerting may save bandwidth, particularly when bandwidth is limited in the midst of an emergency.

With continued reference to FIG. 2, at step 113, a type of emergency may be determined. For example, server 101 may obtain information with regard to reaching a threshold seismic related value (e.g., a value from a seismometer) may indicate an earthquake indicative of an emergency. A type of emergency may further be based on reaching a threshold value associated with seismic information, meteorological information, radiological information (e.g., nuclear event), or biological information (e.g., value of chemicals in water), among other things. The type of emergency may be seismic (e.g., manmade or natural earthquake), meteorological (e.g., hurricane, flood, tornado), radiological (e.g., nuclear accident or bomb), biological, chemical, artillery based, or the like.

At step 114, an emergency alert may be sent to the SAVE device based on the type of emergency, the location of the emergency (or relevant area), or configuration of the SAVE device.

The SAVE device may be a relatively simple, low cost, and fast way to address the challenges in public alerting as disclosed herein. The disclosed SAVE public warning system may be integrated into every day IoT devices (e.g., lights, microwaves, vending machines, etc.) or may be separate devices that are located throughout an area. Anyone of these integrated or separate devices may be considered a SAVE device.

There may be a first group of SAVE devices designed to work at indoor and limited outdoor areas (e.g., bus stops), while there may be second group of SAVE devices designed for wide-area alerting and deployed at government facilities (e.g., fire stations, police precincts, etc.). Some configurations of SAVE devices may be configured as receive-only and may NOT relay local conditions data to the alert originator. Audible alert (e.g., horn) or visual alert (e.g., strobe) may be configured in accordance with domestic or international standards, but distinct from existing warning signals. This distinction may minimize confusion by the population being warned.

As with WEA, wireless carriers may provide transit for governmental warnings generated by appropriate local/state/national/military authorities. In the event of an EEWS seismic alert, an algorithm-based earthquake warning center (EWC) operated by seismologists may analyze initial data, estimate quake severity and geography, and decide if and where (as described by a latitudinal/longitudinal polygon) to issue an alert. Authorities, having decided to issue a seismic alert, may cue the EWC to notify participating wireless carriers in that area to activate all EEWS-capable devices being served by cellsites in that polygon via the cell broadcast functions in the networks. EEWS-capable devices (both handsets and SAVE devices) may activate their distinctive EEWS alarm behavior as they receive the cell broadcast messages, and users may take immediate protective action as previously instructed by local public education outreach programs.

As for manmade threats, once governmental-carrier liaison is established and military equivalents of the EWC are linked to carrier networks, alerting to those threats over both EEWS-capable handsets and SAVE devices may proceed in similar fashion. If implemented in advance of attacks, the SAVE system may provide civil and military authorities with a previously-unavailable alerting tool that may be fast and relatively precise (e.g., alerts may be tailored to the cell sector level). When combined with the slower WEA system, civil and military authorities may be able to use SAVE and WEA to communicate effectively at an unprecedented level with those potentially affected in a conflict zone.

As with WEA, wireless carriers would simply provide transit for governmental warnings generated by appropriate local/state/national/military authorities. In the event of an EEWS seismic alert, an algorithm-based earthquake warning center (EWC) operated by seismologists would analyze initial data, estimate quake severity and geography, and decide if and where (as described by a latitudinal/longitudinal polygon) to issue an alert. Authorities, having decided to issue a seismic alert, would cue the EWC to notify participating wireless carriers in that area to activate all EEWS-capable devices being served by cellsites in that polygon via the cell broadcast functions in the networks. EEWS-capable devices (both handsets and SAVE devices) would activate their distinctive EEWS alarm behavior as they receive the cell broadcast messages, and users would take immediate protective action as previously instructed by local public education outreach programs Examples of objects that may fall into the scope of Internet of Things include connected security systems, thermostats, cars, electronic appliances (e.g., refrigerator, toaster, microwave), lights (e.g., overhead lights or lamps) in household or commercial environments, alarm clocks, speaker systems, vending machines, or medical devices, among other things. Sensors may be any type of sensor, such as humidity sensors, motion sensors, temperature sensor, proximity sensor, accelerometer, Infrared sensor, pressure sensor, light sensor, ultrasonic sensor, smoke sensor, gas sensor, metal detectors, or the like. Different tones or the way alerting is coordinated through the sensors may indicate a different type of alert than what is normally expected through the sensor. For example, the metal detector that may be used to detect metal in weapons and make an alert in that manner may now assist in alerting with regard to emergencies, such as weather events or the like. Vehicle 102 may be any type of vehicle, such as autonomous vehicles or unmanned vehicles that travel via land, water, or air. Medical devices may include devices (preferably non-life sustaining devices), such as glucose monitoring devices, hearing aids, inhalers, or the like.

It is contemplated herein that SAVE devices may be coordinated at a location, such a building (e.g., a school, office building, restaurant, or home) at or near geographical coordinates that may be obtained by using global positing system or the like. For example, a school may have vending machines (e.g., with multiple tones), lights, and sensors (e.g., with a single tone). The SAVE devices may be configured so the pattern of the tone played by the vending machines and sensor may coincide (e.g., same time) with the lights being turned off or on at the school location. In another example, an audio or visual wave pattern (cascading in a direction) of the SAVE devices (e.g., lights being turned off and on and the tones of other devices), may indicate the direction of the designated exit, safe location (e.g., with emergency personnel), or the direction of danger.

Figure 3:
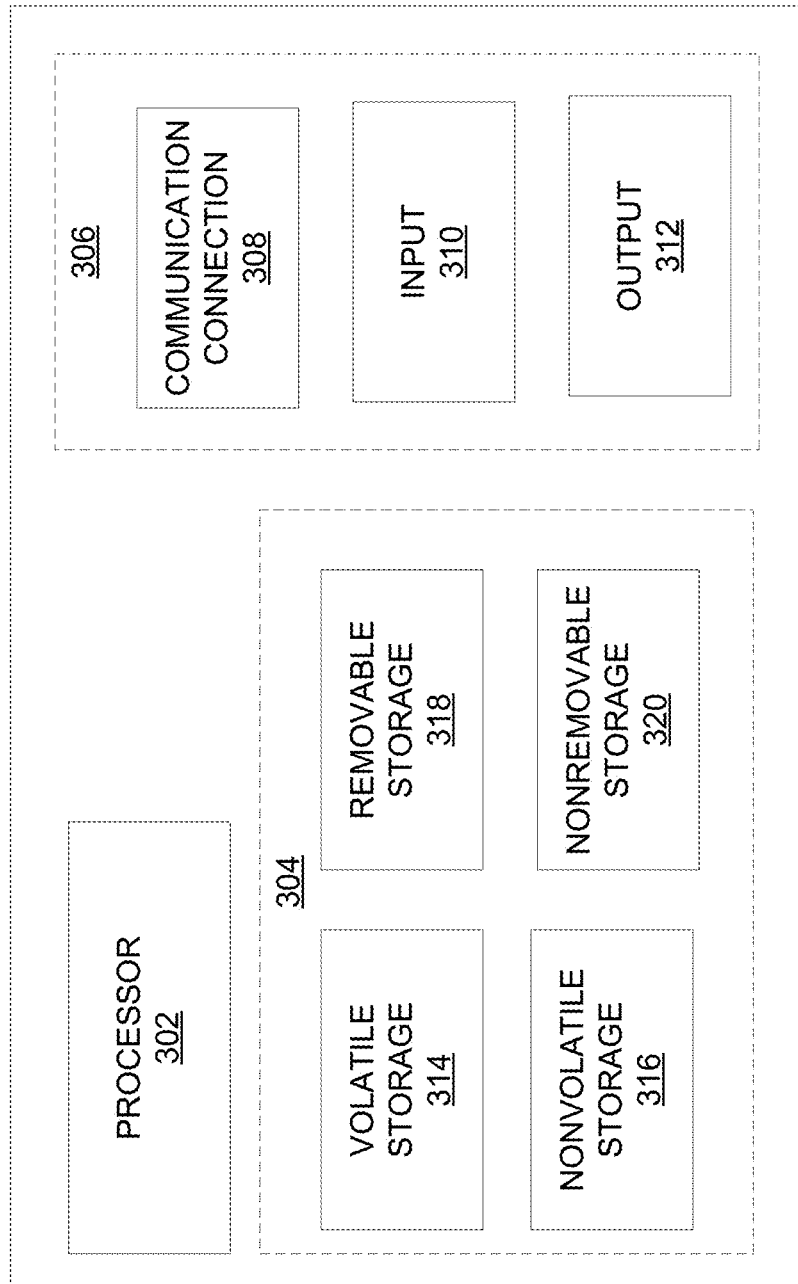
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. As an example, the devices of FIG. 1 may be connected via wireless or wired connections. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
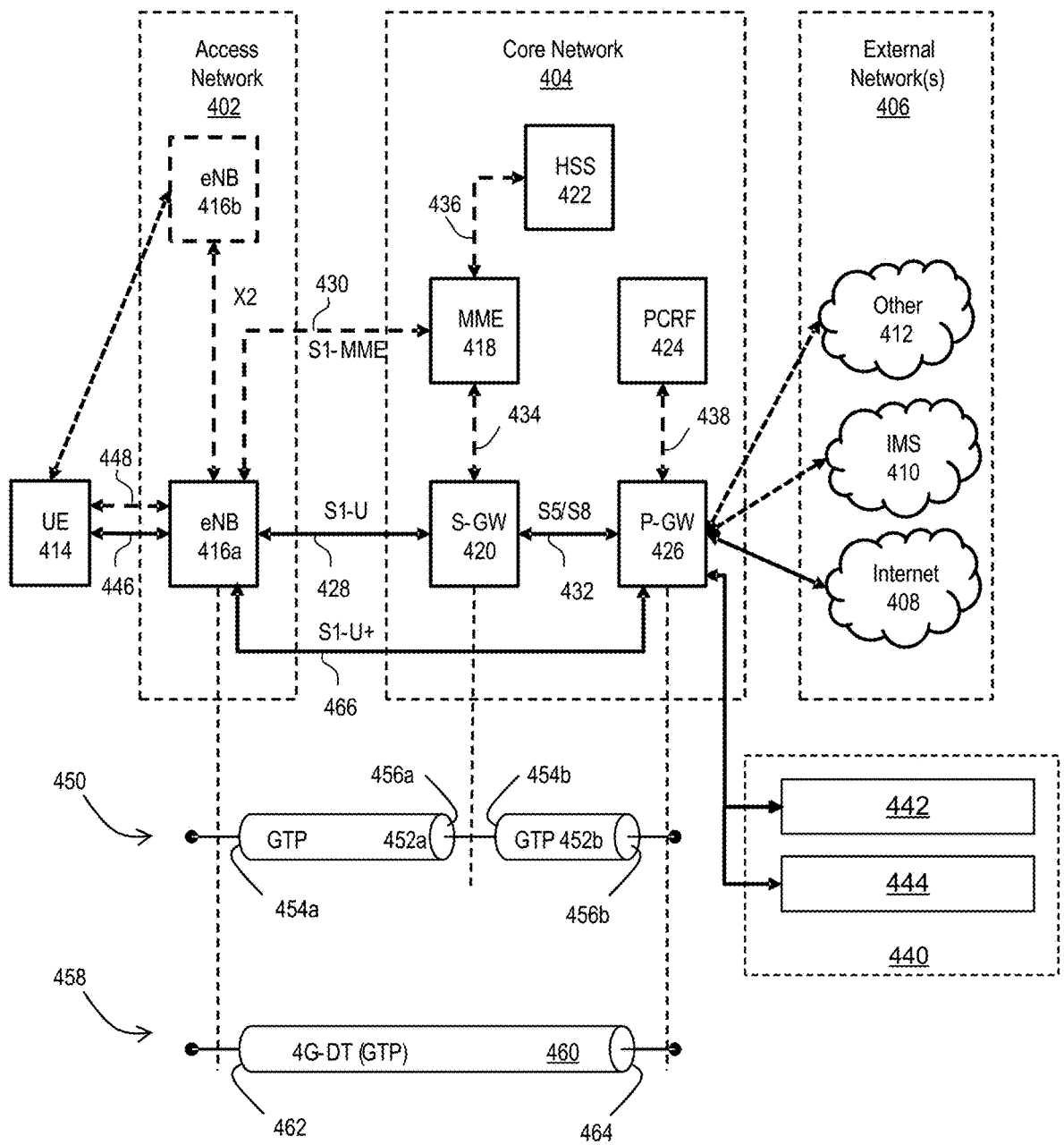
FIG. 4 illustrates an exemplary communication system that provides wireless telecommunication services over wireless communication networks.

FIG. 4 illustrates a functional block diagram depicting one example of an LTE-EPS network architecture 400 that may used with a SAVE public warning system. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one example, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one example, the core network 404 includes various network entities, such as MME 418, SGW 420, Home Subscriber Server (HSS) 422, Policy and Charging Rules Function (PCRF) 424 and PGW 426. In one example, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all examples of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some examples, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some examples, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some examples, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some examples, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one example, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some examples, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some examples, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
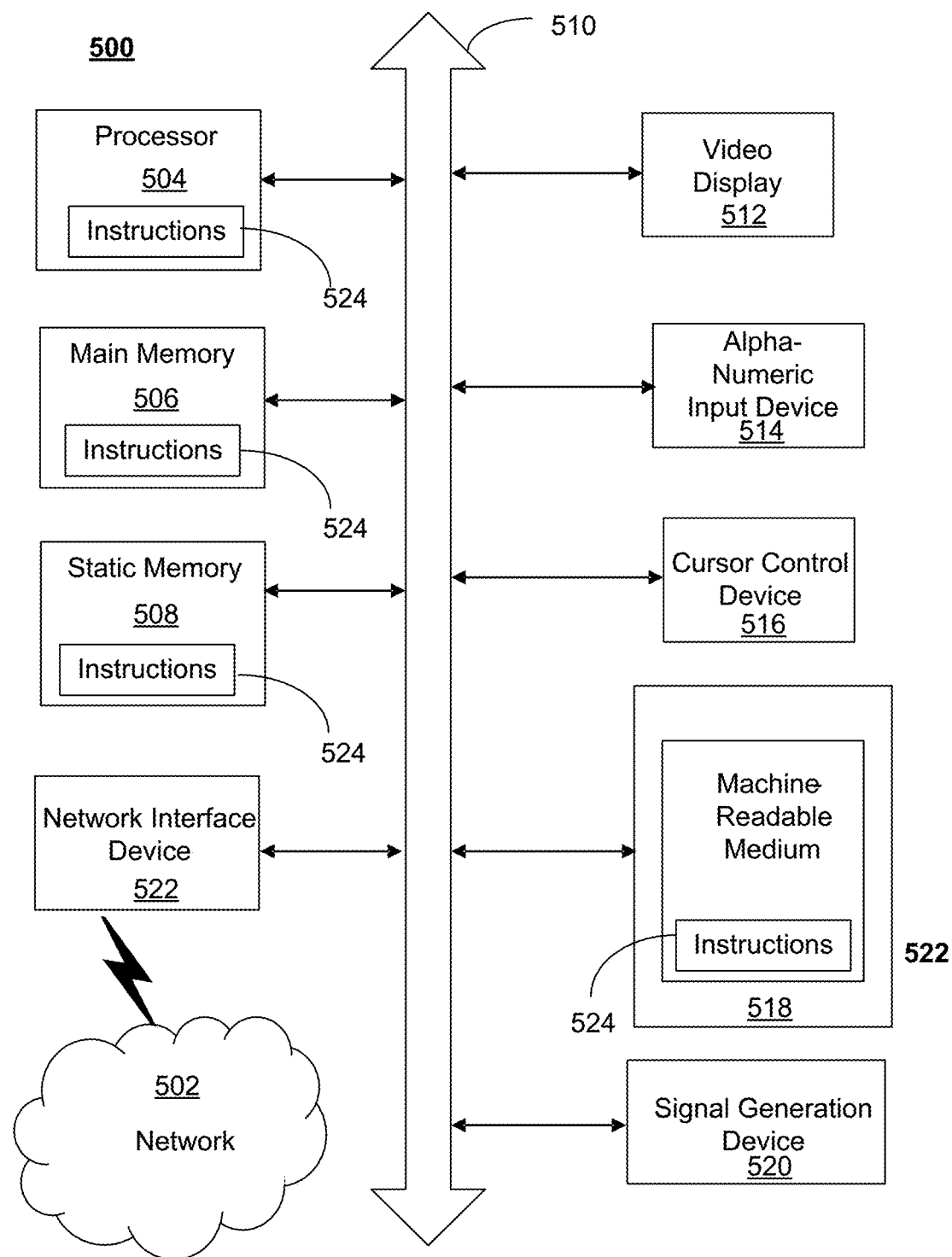
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426, or other devices of FIG. 1 and FIG. 4. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
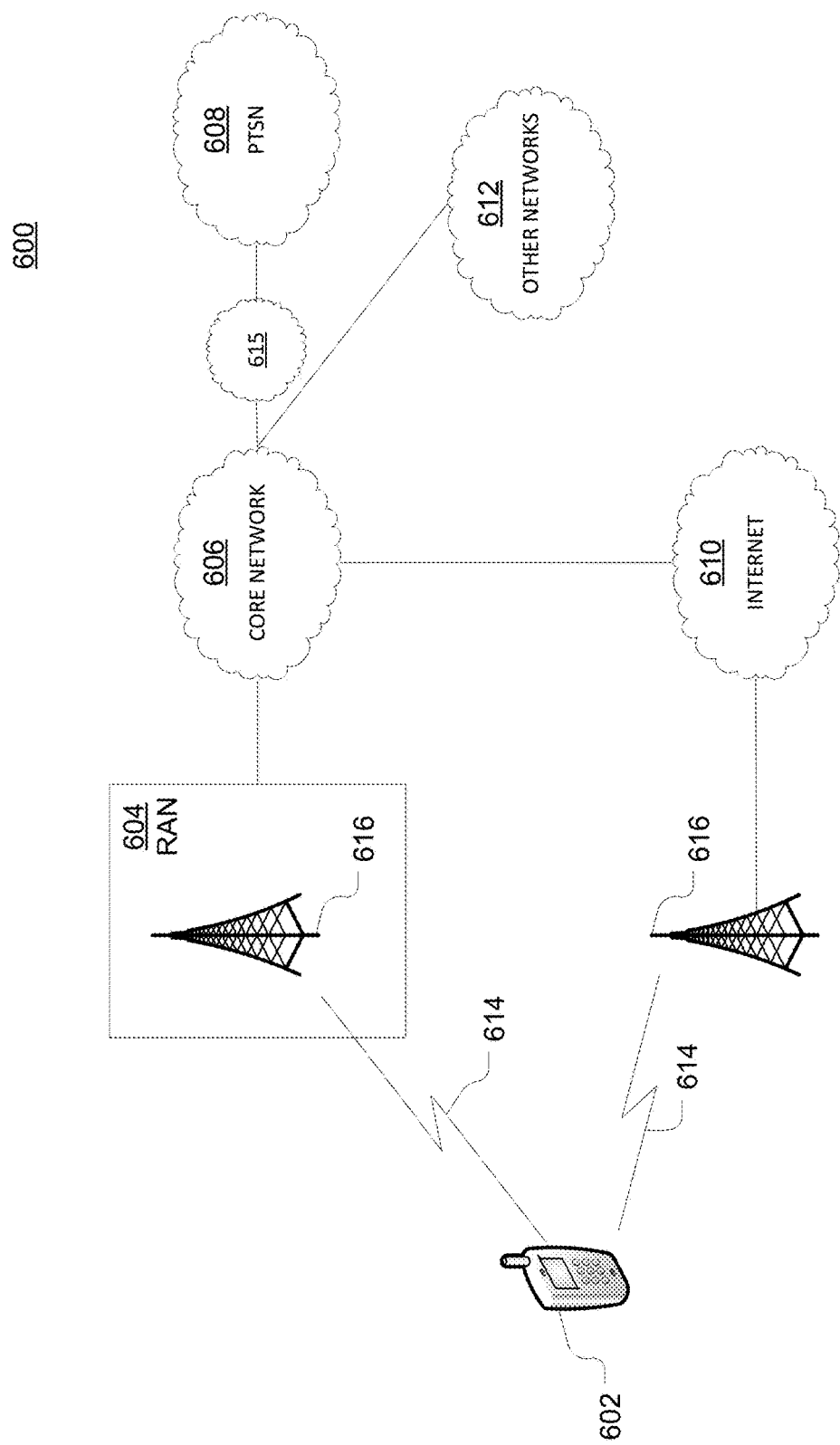
FIG. 6 illustrates an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may include a mobile device, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
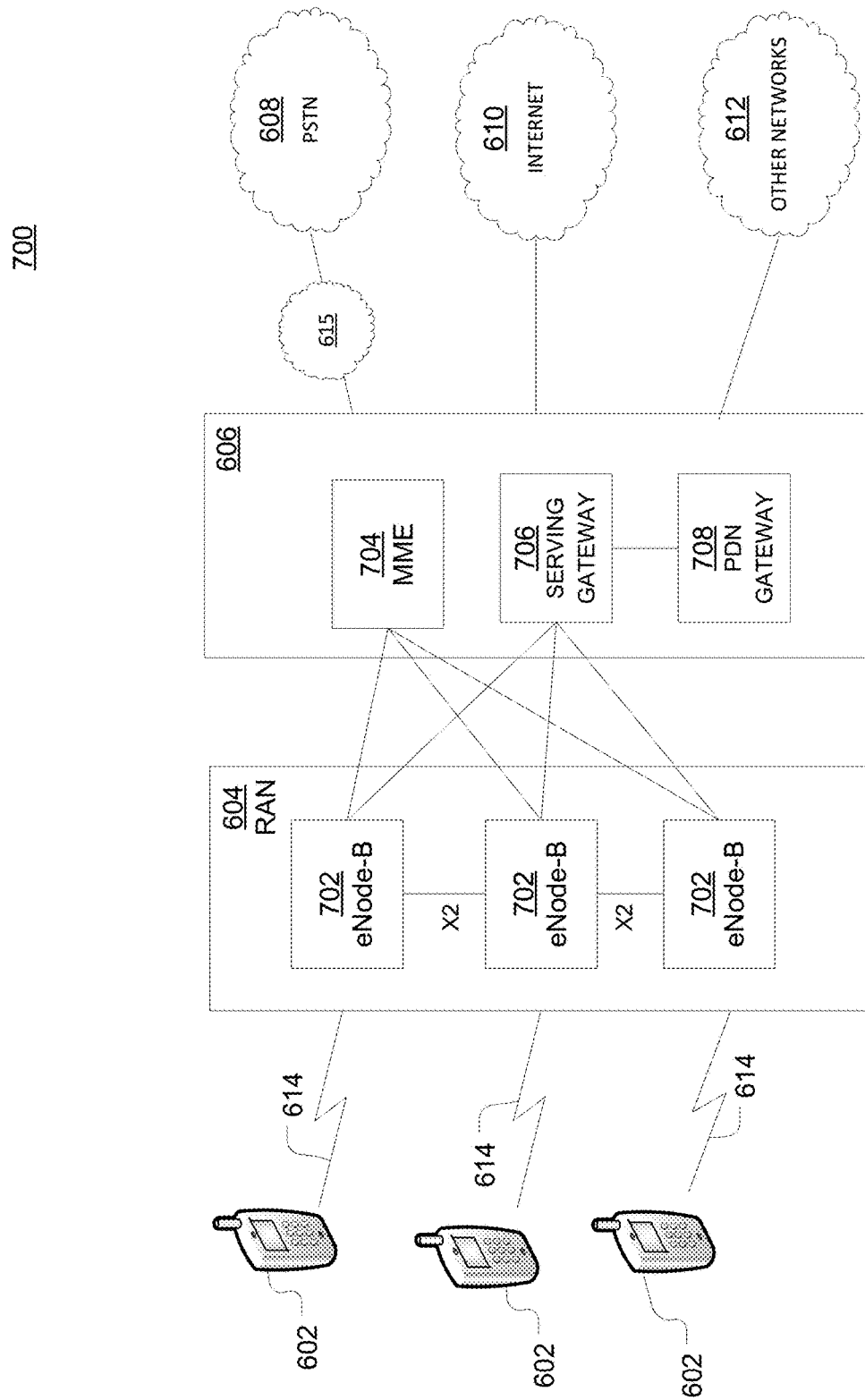
FIG. 7 illustrates an example system diagram of a radio access network and a core network.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 615, to facilitate communications between WTRUs 602 and traditional landline communications devices. In addition, core network 606 may provide the WTRUs 602 with access to other networks 612, which may include other wired or wireless networks that are owned or operated by other service providers.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple machine-to-machine devices (which may also be IoT devices)—through enhanced wireless management.

While examples of a telecommunications system in which emergency alerts associated with SAVE device can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—SAVE public warning system—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. It is contemplated herein that SAVE devices may be coordinated at a location. For example, a school may have vending machines (e.g., with multiple tones), lights, and sensors (e.g., with a single tone). The SAVE devices may be configured so that the pattern of the tone played by the vending machines and sensors may coincide (e.g., same time) with the lights being turned off or on at the school location. In another example, an audio or visual wave pattern (cascading in a direction) of the SAVE devices (e.g., lights being turned off and on and the tones of other devices), may indicate the direction of the designated exit, safe location (e.g., with emergency personnel), or the direction of danger.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   a memory coupled with the processor, the memory comprising executable instructions that when executed by the processor cause the processor to effectuate operations comprising:
   obtaining an indication of an emergency, the indication of the emergency is for a first location and a second location;
   determining a respective configuration of each device of a first plurality of internet of things (IoT) devices at the first location and a respective configuration of each device of a second plurality of IoT devices at the second location, wherein the respective configuration of each device of the first plurality of IoT devices and the second plurality of IoT devices comprises an audio configuration or a visual configuration for each device of the first plurality of IoT devices at the first location, wherein the first plurality of IoT devices comprise different types of IoT devices;
   determining a type of emergency; and
   sending a message with an emergency alert to the first plurality of IoT devices and the second plurality of IoT devices, wherein the message comprises instructions to coordinate audio or visual indicators associated with the emergency alert, based on the type of emergency, in a first way among the first plurality of IoT devices and in a second way among the second plurality of IoT devices, wherein the first way and the second way are different.

2. The apparatus of claim 1, wherein the respective configuration of the first plurality of IoT devices further comprises a memory configuration for each device of the first plurality of IoT devices at the first location.

3. The apparatus of claim 1, wherein the determining of the type of emergency is based on meteorological information.

4. The apparatus of claim 1, wherein the instructions to coordinate the audio indicators or the visual indicators comprise a directional pattern.

5. The apparatus of claim 1, wherein the determining of the type of emergency is based on seismic information.

6. The apparatus of claim 1, wherein the first plurality of IoT devices comprise a light.

7. The apparatus of claim 1, wherein the apparatus is a server.

8. A method comprising:
   obtaining an indication of an emergency, the indication of the emergency is for a first location and a second location;
   determining a respective configuration of each device of a first plurality of internet of things (IoT) devices at the first location and a respective configuration of each device of a second plurality of IoT devices at the second location, wherein the respective configuration of each device of the first plurality of IoT devices and the second plurality of IoT devices comprises an audio configuration or a visual configuration for each device of the first plurality of IoT devices at the first location, wherein the first plurality of IoT devices comprise different types of IoT devices;

determining a type of emergency; and sending a message with an emergency alert to the first plurality of IoT devices and the second plurality of IoT devices, wherein the message comprises instructions to coordinate audio or visual indicators associated with the emergency alert, based on the type of emergency, in a first way among the first plurality of IoT devices and in a second way among the second plurality of IoT devices, wherein the first way and the second way are different.

9. The method of claim 8, wherein the respective configuration of the first plurality of IoT devices further comprises a memory configuration for each device of the first plurality of IoT devices at the first location.

10. The method of claim 8, wherein the determining of the type of emergency is based on meteorological information.

11. The method of claim 8, wherein the instructions to coordinate the audio indicators or the visual indicators comprise a directional pattern to a safe location or a directional pattern to a direction of danger.

12. The method of claim 8, wherein the determining of the type of emergency is based on seismic information.

13. The method of claim 8, wherein the first plurality of IoT devices comprise a light.

14. The method of claim 8, wherein the first plurality of IoT devices comprise a sensor.

15. A non-transitory computer readable storage medium storing computer executable instructions that when executed by a computing device cause said computing device to effectuate operations comprising:

obtaining an indication of an emergency, the indication of the emergency is for a first location and a second location;

determining a respective configuration of each device of a first plurality of internet of things (IoT) devices at the first location and a respective configuration of each device of a second plurality of IoT devices at the second location, wherein the respective configuration of each device of the first plurality of IoT devices and the second plurality of IoT devices comprises an audio configuration or a visual configuration for each device of the first plurality of IoT devices at the first location, wherein the first plurality of IoT devices comprise different types of IoT devices;

determining a type of emergency; and sending a message with an emergency alert to the first plurality of IoT devices and the second plurality of IoT devices, wherein the message comprises instructions to coordinate audio or visual indicators associated with the emergency alert, based on the type of emergency, in a first way among the first plurality of IoT devices and in a second way among the second plurality of IoT devices, wherein the first way and the second way are different.

16. The computer readable storage medium of claim 15, wherein the respective configuration of the first plurality of IoT devices further comprises a memory configuration for each device of the first plurality of IoT devices at the first location.

17. The computer readable storage medium of claim 15, wherein the determining of the type of emergency is based on meteorological information.

18. The computer readable storage medium of claim 15, wherein the instructions to coordinate the audio indicators or the visual indicators comprise a directional pattern to a designated exit.

19. The computer readable storage medium of claim 15, wherein the determining of the type of emergency is based on seismic information.

20. The computer readable storage medium of claim 15, wherein the first plurality of IoT devices comprise a motion sensor.

* * * * *